Figure 1:
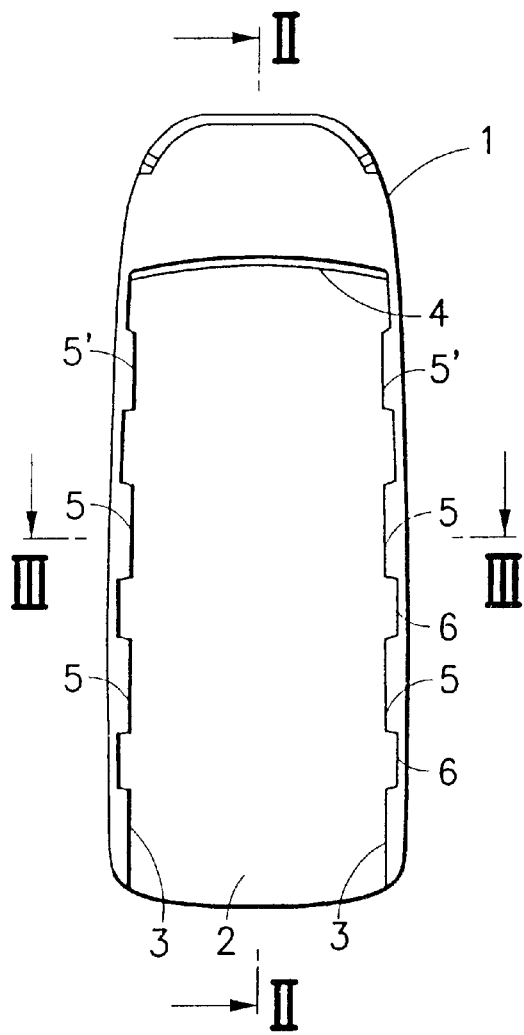

United States Patent

Remes et al.

[11] Patent Number: 6,060,193
[45] Date of Patent: May 9, 2000

[54] BATTERY FOR A MOBILE PHONE

[75] Inventors: Timo Remes, Salo; Seppo Jaara, Oulu, both of Finland

[73] Assignee: Nokia Mobile Phones, Ltd., Espoo, Finland

[21] Appl. No.: 09/095,150

[22] Filed: Jun. 10, 1998

[30] Foreign Application Priority Data

Jun. 17, 1997 [FI] Finland ................................ 972570

[51] Int. Cl.[7] .................................................. H01M 2/02
[52] U.S. Cl. ................ 429/96; 429/97; 429/163
[58] Field of Search ...................... 429/96, 97, 98, 429/123, 163, 100

[56] References Cited

U.S. PATENT DOCUMENTS

| | | | |
|---|---|---|---|
| 4,904,549 | 2/1990 | Goodwin et al. | 429/97 |
| 5,136,229 | 8/1992 | Galvin | 320/2 |
| 5,308,716 | 5/1994 | Shababy et al. | 429/97 |
| 5,604,050 | 2/1997 | Brunette et al. | 429/97 |
| 5,625,271 | 4/1997 | Shapiro et al. | 320/2 |
| 5,660,945 | 8/1997 | McCormick et al. | 429/123 |
| 5,665,485 | 9/1997 | Kuwayama et al. | 429/100 |

FOREIGN PATENT DOCUMENTS 0 743 689 A1  11/1996  European Pat. Off. .

OTHER PUBLICATIONS

European Search Report Aug. 28, 1998.

*Primary Examiner*—Maria Nuzzolillo
*Assistant Examiner*—Monique M. Wills
*Attorney, Agent, or Firm*—Perman & Green, LLP

[57] ABSTRACT

The invention relates to the attachment of a mobile phone battery in which the battery (9) is pushed in the horizontal direction, for example in the direction of the surface of the phone, into a recess (2) formed in the casing (1) of the phone. The sides of the battery (9) are equipped with tabs (10, 10'), which slide under the tabs (5, 5') of the tabs on the sides of the recess (2) in such a way that these hold the battery in place in the vertical direction. Holding of the battery (9) in place in the horizontal direction is arranged with at least one locking element (12), which according to the invention is located on the side of the battery and locks, when viewed in the direction of pushing, behind the tab (5') on the side of the recess in such a way that the tab (5') functions as an element that holds the battery in place simultaneously in both the horizontal and vertical direction. The locking element (12) is loaded with a spring which, when pushed, releases the battery from the locking, enabling it to be pulled loose.

5 Claims, 2 Drawing Sheets

BATTERY FOR A MOBILE PHONE

BATTERY FOR A MOBILE PHONE

The invention relates to a mobile phone battery that can be mounted in place by pushing it in the horizontal plane, i.e. in the direction of the phone's surface into a recess formed by the phone's casing, and it comprises at least one locking element which engages with a catch in the recess, preventing the battery from being pulled loose horizontally, tabs on the sides of the battery, which slide under the tabs on the sides of the recess to hold the battery in place in the vertical direction as well as a spring which loads the locking element and when pressed releases the locking element from the catch to enable the battery to be pulled loose. The battery of a mobile phone is typically a rather flat slablike piece which attaches retractably to the bottom side of the phone, fitting into a recess that has been formed for it. Fitting the battery into place is accomplished by a pushing motion in the direction of the phone's bottom surface, at the end of which the battery locks into the recess when the springloaded locking element engages with the catches that have been provided in the recess. The spring is incorporated in a push button which when pressed releases the battery's locking element from the catches in the recess, allowing the battery to be removed by means of a pulling motion in the opposite direction to the pushing motion.

In present-day mobile phones, the mentioned locking elements belonging to the battery are positioned at the end of the battery such that the end, when the battery is pushed into place in the recess in the phone, comes up against the end of the recess which is opposite it, the end being equipped with catches corresponding to the locking elements. The locking elements and the catches in the recess hold the battery in place in the horizontal direction, i.e. in the direction of the phone's bottom surface. Vertical detachment of the battery is prevented by the tabs on the sides of the battery, which, when the battery is mounted in place, have been pushed under the corresponding tabs that are provided on the sides of the recess.

The purpose of the present invention is to provide a solution whereby fitting of the battery into the recess of the phone's casing can be simplified. The battery according to the invention is characterized in that the locking element is located on the side of the battery and is arranged so as to lock, viewed from the pushing direction, behind the tab on the side of the recess, the tab acting as a catch.

The invention means, in particular, a further simplification of the recess formed to receive the phone's battery. Since the catch on the side of the recess acts as an obstacle preventing the battery from moving out of its position horizontally, the catches at the end of the recess, which have belonged to the above described previously known solution model, can be omitted since they are not needed. The resulting advantages are a simplification of the manufacturing mould for the phone's casing as well as the possibility of designing the battery with a flatter contour than before.

According to an especially advantageous embodiment of the invention, on the side of the battery there is a tab which slides under the tab of the mentioned locking element, this tab acting as a catch, in such a way that the first tab acts as an element that holds the battery in place simultaneously in the horizontal and vertical direction.

Figure 3:
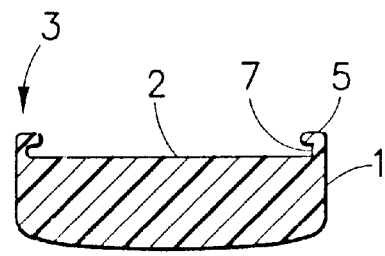
Figure 2:
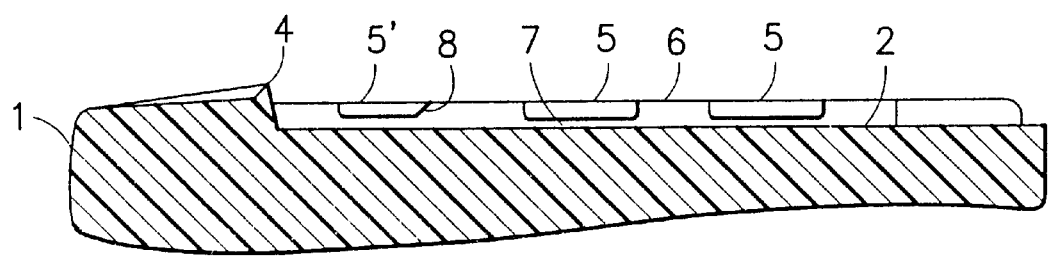
Figure 4:
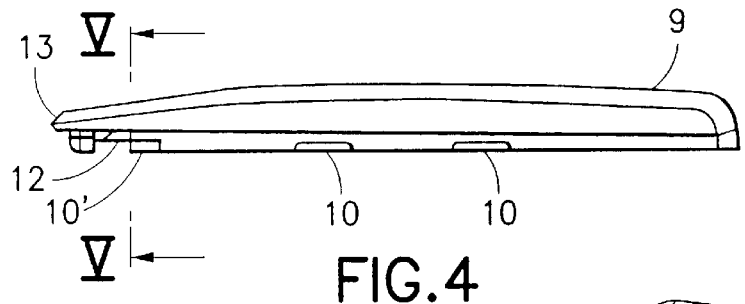
Figure 5:
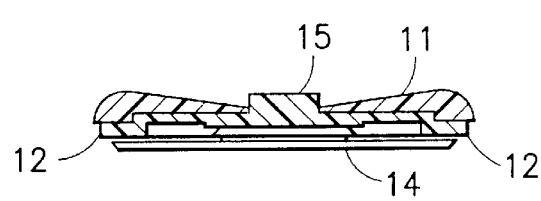
Figure 6:
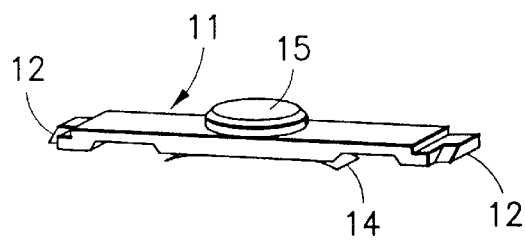
Figure 7:
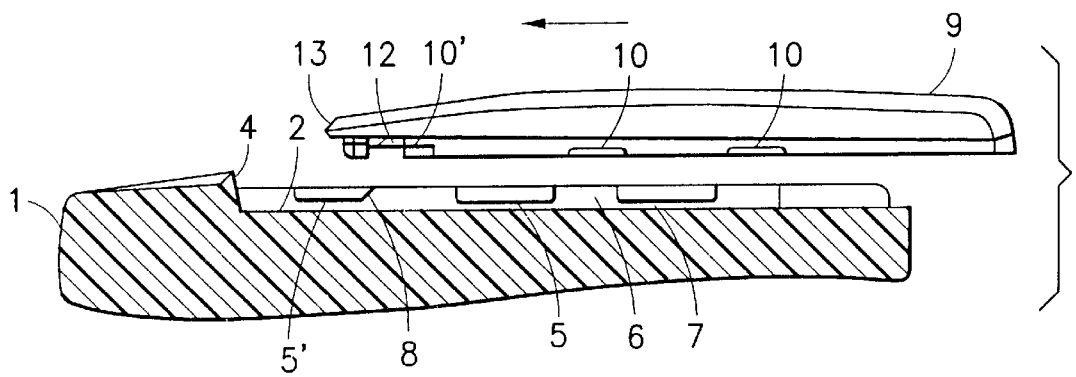
Figure 8:
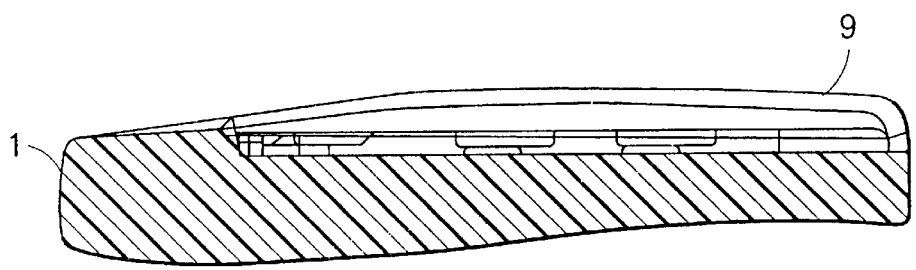
Figure 9:
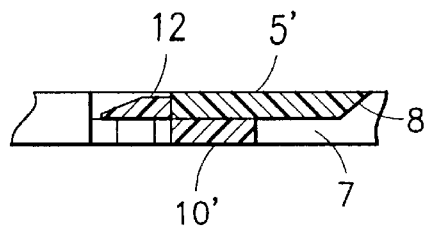

The invention is described in the following in greater detail by way of an example with reference to the accompanying drawings in which FIG. 1 shows the casing of a mobile phone from the bottom side with the recess in it for a battery, FIG. 2 shows a longitudinal section of the casing, II—II, from FIG. 1, FIG. 3 shows a cross section of the casing, III—III, from FIG. 1, FIG. 4 is a side view of a battery that is fitted into the recess of the phone according to FIG. 1, FIG. 5 shows the battery with its locking parts as a sectional view V—V from FIG. 4, FIG. 6 shows the locking part of the battery according to FIGS. 4 and 5, FIG. 7 depicts the fitting into place of the battery according to FIG. 4 by pushing it into the recess in the casing of the phone according to FIGS. 1–3, FIG. 8 shows a phone in which the battery is fitted into the recess, and FIG. 9 shows, in a larger scale, the locking between the catch incorporated in the recess and the locking element belonging to the battery.

FIGS. 1–3 show the casing 1 of a mobile phone at the bottom of which is a wide and shallow recess 2 which runs in the direction of the top of the phone and into which the phone's battery can be fitted. The recess 2 comprises the longitudinal sides 3 of the casing 1 as well as a lateral end 4 which is arranged to come up against the end of the battery that is pushed into place. On both sides 3 of the recess 2, there are tabs 5, 5' which are positioned symmetrically in the direction of the phone's bottom surface and between which there remain spaces 6 and beneath which there are grooves 7 to receive the tabs on the sides of the battery. The tabs that are nearest to the end 4 of the recess have bevels 8 which are seen in FIG. 2 and are oriented towards the direction from which the battery is pushed into place.

The mobile phone battery 9 according to FIGS. 1–3, which is shown in FIG. 4, is a fairly flat piece that is contoured to fit into the recess 2 in the phone as shown in FIG. 8. On the sides of the battery 9 are tabs 10, 10', which can be pushed into the grooves 7 in the sides 3 of the recess in such a way that they seat under the tabs 5, 5' in the sides of the recess. In addition, the battery 9 is equipped with a spring-loaded locking piece 11 according to FIG. 6, which comprises a protruding locking element 12 that is wedge-shaped at its pointed end and positioned symmetrically on both sides of the battery. The locking piece 11 is positioned near the tip 13 of the battery in such a way that the locking elements 12 are located immediately in front of the frontmost tabs 10' along the sides of the battery. The spring 14 that is located between the locking elements 12 holds the locking piece 11 in a raised position such that the locking elements 12 are located in the normal state somewhat higher up than the tabs 10' along the sides of the battery as can be seen, for example, in FIG. 4. By pressing the push button 15 of locking piece 11 against the spring 14, the locking elements 12 can nevertheless be brought to the same level as the tabs 10' on the sides of the battery.

The fitting of the battery 9 into place in the recess 2 in the casing 1 of the phone and its locking into it are shown in FIGS. 7–9. The battery 9 is placed in the recess 2 first in such a way that the tabs 10, 10' on the sides of the battery and the locking elements 12 are positioned at the spaces 6 between the tabs 5 on the sides 3 of the recess. Thereafter the battery 9 is pushed in the direction of the bottom surface of the phone towards the end 4 of the recess, i.e. to the left in FIG. 7, whereby the bevels 8 of the frontmost tabs 5' on the sides of the recess guide the battery's similarly bevelled locking elements 12 and the tabs 10' after them so that they slide into the grooves 7 underneath the tabs 5' whilst the battery's side tabs 10 further back push in a similar manner into the grooves 7 underneath the tabs 5 that are further back in the recess. When the pushing movement ceases as the tip 13 of the battery bumps into the end 4 of the recess, the battery's locking elements 12 have at the same time passed the frontmost side tabs 5' of the recess, whereby the locking elements 12 snap up, owing to the effect of the spring 14, substantially to the same level with the mentioned tabs 5', as can be seen in FIG. 9. At the same time, the tabs 10, 10' on the sides of the battery 9, remain in the grooves 7 underneath the side tabs 5, 5' of the recess, as likewise can be seen in FIG. 9. The tabs 5, 5' of the recess and the tabs 10, 10' of the battery, which remain under the aforementioned tabs, thus accomplish the locking, which prevents the battery from moving out of place in the vertical direction at the same time as the frontmost tabs 5' of the recess together with the battery's locking elements 12 function as a locking mechanism preventing movement of the battery out of place in the direction of the phone's surface, i.e. horizontally. Removal of the battery takes place by pressing the push button 15 of the locking piece 11 so that the locking elements 12 are depressed to the level of the side tabs 10', whereby the battery can be pulled out of place by a movement opposite to the pushing movement described above.

It is clear to one versed in the art that the various embodiments of the invention are not confined to the above presented example but can vary within the purview of the accompanying claims.

What is claimed is:

1. A mobile phone battery (9), which can be fit into place by pushing it in the horizontal direction, that is, in the direction of the surface of the phone into a recess (2) formed in the casing (1) of the phone and which comprises at least one locking element (12), which engages with an associated casing tab (5') in the recess, preventing the battery from being pulled loose in the horizontal direction, battery tabs (10, 10') on the sides of the battery, which slide under the casing tabs (5, 5') on the sides of the recess to hold the battery in place in the vertical direction and a spring (14) that loads the locking element and which, when pressed, allows the locking element to be released from the catch to enable the battery to be pulled loose, characterized in that the locking element (12) is positioned on the side of the battery (9) and is arranged to lock, when viewed from the pushing direction, behind the casing tab (5') that acts as a catch, which is positioned on the side (3) of the recess (2), and further characterized in that the tip of the locking element (12) is wedge-shaped and that the casing tab (5') of the recess is bevelled on its side (8) running in the direction of pushing, in a way corresponding to the tip of the locking element, such that when the battery (9) is pushed into place, the bevel of the casing tab guides the locking element so that it slides under the casing tab.

2. A battery according to claim 1, characterized in that the battery tab (10') on the side of the battery (9) slides under the casing tab (5') that acts as a catch of the mentioned locking element (12) in such a way that said battery tab acts as an element that holds the battery in place simultaneously in both the horizontal and vertical direction.

3. A battery according to claim 2, characterized in that the locking element (12) is located immediately in front of the casing tab (5') which is on the side of the battery (9) and in front of the battery tab (10') that remains under the casing tab (5') of the recess.

4. A battery according to claim 1, characterized in that the battery (9) comprises a locking element (12) symmetrically on each of its sides and that a spring (14) which loads the locking elements is located between the locking elements.

5. A battery according to claim 4, characterized in that the battery (9) is equipped with a push button (15) that acts on the spring (14) and which, when pressed, allows the locking elements (12) to be released from the casing tabs (5') of the recess (2), which casing tabs act as catches.

* * * * *